US012688790B2

(12) United States Patent
     Ghedina

(10) Patent No.: US 12,688,790 B2
(45) Date of Patent: Jul. 21, 2026

(54) SIMULATION DEVICE FOR VIRTUAL REALITY EXPERIENCES

(71) Applicant: VVR S.R.L., Padua (IT)

(72) Inventor: Michele Ghedina, Padua (IT)

(73) Assignee: VVR S.R.L., Padua (IT)

( * ) Notice: Subject to any disclaimer, the term of this patent is extended or adjusted under 35 U.S.C. 154(b) by 680 days.

(21) Appl. No.: 18/002,724

(22) PCT Filed: Jun. 24, 2021

(86) PCT No.: PCT/IB2021/055606
     § 371 (c)(1),
     (2) Date: Dec. 21, 2022

(87) PCT Pub. No.: WO2021/260615
     PCT Pub. Date: Dec. 30, 2021

(65) Prior Publication Data
     US 2023/0326362 A1      Oct. 12, 2023

(30) Foreign Application Priority Data
     Jun. 25, 2020    (IT) ......................... 102020000015337

(51) Int. Cl.
     *G09B 9/12*        (2006.01)
     *A63G 31/16*       (2006.01)
     *G09B 9/30*        (2006.01)
(52) U.S. Cl.
     CPC .............. *G09B 9/12* (2013.01); *A63G 31/16*
     (2013.01); *G09B 9/307* (2013.01)
(58) Field of Classification Search
     CPC ................................ G09B 9/307; A63G 31/16
     See application file for complete search history.

(56) References Cited

U.S. PATENT DOCUMENTS 5,060,932 A * 10/1991 Yamaguchi .............. G09B 9/14
                                                    434/45
5,759,107 A *  6/1998 Nagel .................... A63G 31/16
                                                    472/60

(Continued)

FOREIGN PATENT DOCUMENTS

CN        106297473 B      8/2017
DE     102011102037 A1     3/2013
GB          131363 A       5/1918

OTHER PUBLICATIONS

International Search Report mailed Oct. 15, 2021 for PCT/IB2021/055606 filed Jun. 24, 2021, 12 pages.

*Primary Examiner* — Xuan M Thai
*Assistant Examiner* — Sadaruz Zaman
(74) *Attorney, Agent, or Firm* — Vorys, Sater, Seymour and Pease LLP; Maryellen Feehery Hank; Anthony P. Venturino

(57)                ABSTRACT

Simulation device having a platform positionable in a horizontal plane, a rotary base secured to the platform rotatable relative to the platform about a first axis extending vertically when the platform is in the horizontal plane, a movable structure supported by the rotary base and a control unit. The movable structure has a first ring secured to the rotary base rotatable relative to the rotary base about a second axis perpendicular to the first axis, a second ring internal relative to the first ring and secured thereto rotatable relative to the first ring about a third axis perpendicular to the second axis, and a support element, internal relative to the second ring, secured thereto rotatable relative to the second ring about a fourth axis perpendicular to the third axis. The control unit configured to move a user in a seat of the support element towards a desired position.

11 Claims, 4 Drawing Sheets

(56) References Cited

U.S. PATENT DOCUMENTS

| | | | | |
|---|---|---|---|---|
| 5,980,256 | A * | 11/1999 | Carmein | G09B 9/165 |
| | | | | 482/902 |
| 6,347,999 | B1 * | 2/2002 | Yuan | A63F 13/812 |
| | | | | 472/60 |
| 7,033,176 | B2 * | 4/2006 | Feldman | A63B 22/001 |
| | | | | 482/8 |
| 7,559,766 | B2 * | 7/2009 | Epley | A61B 5/4863 |
| | | | | 434/34 |
| 11,039,973 | B2 * | 6/2021 | Budagher | A61H 1/001 |
| 2006/0121420 | A1 * | 6/2006 | Athanas | G09B 9/165 |
| | | | | 434/31 |
| 2014/0087334 | A1 * | 3/2014 | Schlusselberger | G09B 9/02 |
| | | | | 434/29 |

* cited by examiner

SIMULATION DEVICE FOR VIRTUAL REALITY EXPERIENCES

TECHNICAL FIELD

The present invention relates to a simulation device for virtual reality experiences and a method for moving such a simulation device.

TECHNOLOGICAL BACKGROUND

The invention is used particularly, though not exclusively, in the technical field relevant to virtual reality, that is to say, the simulation of real situations.

Specifically, the invention is used in recreational or training activities in which there is a need for interaction between a person and specific environmental conditions which are reproduced by means of a simulation system.

In this context, it is known to construct simulators comprising a seat member which is intended to receive a user and which is rotatably mounted inside a structure with concentric rings (generally three) which are hinged one inside the other so as to rotate about respective axes orthogonal to each other and generally to allow the rotation of the user in space about a triplet of orthogonal axes on the basis of specific rotation instructions imparted to the individual rings.

An example of such a simulator is described in the patent document U.S. Pat. No. 5,060,932A.

US 2014/087334 A1 relates to a device for the spatial movement of persons.

However, it may be observed that the known simulators of the type mentioned above may be subject to some limitations.

A first limitation may be identified as the possibility that such simulators, as a result of predetermined orientations of the respective rings, reach a so-called "cardan blocking" condition, in which the free rotation of the user about one of the axes is prevented.

Another limitation may be identified as the difficulty of access to the seat member as a result of the spatial requirement of one or more members of the simulator.

STATEMENT OF INVENTION

An object of the present invention is to provide a simulation device and a method for moving such a simulation device which is structurally and functionally configured to overcome at least one limitation of the above-cited prior art.

This object is achieved by means of a simulation device and a method for moving such a simulation device which are constructed according to the respective independent claims appended to the present description.

Preferred features of the invention are defined in the dependent claims.

According to a first aspect of the invention, the simulation device comprises a platform which is intended to be positioned in a horizontal plane and a rotary base which is secured to the platform with the ability to rotate with respect to the platform about a first rotation axis. The first rotation axis extends in a vertical direction when the platform is positioned in, in particular fixed to, the horizontal plane.

Preferably, the rotary base is actuated by an actuator, preferably by an electromechanical actuator which is provided with an electric motor.

The simulation device further comprises a movable structure which is supported by the rotary base. The rotary base keeps the movable structure raised from the horizontal plane on which the platform is positioned.

The movable structure comprises a first ring which is secured, in particular hinged, to the rotary base with the ability to rotate with respect to the rotary base about a second rotation axis which is perpendicular to the first rotation axis, and a second ring which is internal with respect to the first ring and which is secured thereto with the ability to rotate with respect to the first ring about a third rotation axis which is perpendicular to the second rotation axis.

In particular, the first ring and the second ring are concentric with the radius of the second ring being smaller than that of the first ring.

Preferably, the rotary base comprises a pair of arms which extend in the direction of the first axis and the first ring is secured, in particular hinged, in the region of two diametrically opposite portions thereof about the second rotation axis, to respective end portions of each arm by means of respective rotoidal pairs.

According to an embodiment of the invention, at least one of the rotoidal pairs mentioned above is actuated by an actuator, preferably by an electromechanical actuator provided with an electric motor.

Preferably, the second ring is secured, in particular hinged, in the region of two diametrically opposite portions thereof about the third rotation axis, to respective diametrically opposite portions of the first ring by means of respective rotoidal pairs.

According to an embodiment of the invention, at least one of the rotoidal pairs mentioned above is actuated by an actuator, preferably by an electromechanical actuator provided with an electric motor.

Alternatively, the first ring and the second ring are preferably connected to each other so as to form a rotation thrust bearing which is provided with an external ring and an internal ring, wherein the first ring and the second ring define the external ring and the internal ring of the rotation thrust bearing, respectively. The internal ring can slide on the external ring so as to rotate with respect thereto about the third rotation axis. In this case, the first ring and the second ring are located in the same plane and the second ring is preferably actuated by an actuator, more preferably by an electromechanical actuator provided with an electric motor.

The movable structure further comprises a support element which is internal with respect to the second ring and which is secured, in particular hinged, thereto with the ability to rotate with respect to the second ring about a fourth rotation axis which is perpendicular to the third rotation axis.

The support element is preferably actuated by an actuator, more preferably by an electromechanical actuator provided with an electric motor.

The support element comprises a seat for receiving a user of the simulation device.

In particular, the movable structure comprises a blocking mechanism which is provided to secure the user to the seat in which he/she is received in such a manner that the user is fixedly joined during the movement to the support element.

Preferably, the blocking mechanism comprises shoulder straps or at least one strap/belt, in order to securely secure the user received in the seat to the support element.

The simulation device comprises a control unit which is operatively connected to the rotary base, first ring, second ring and support element, in particular by means of the respective above-mentioned actuators.

The control unit is further configured to rotate, in particular by means of the respective above-mentioned actuators, the rotary base, first ring, second ring and support element about the respective rotation axes so as to move the user who is received in the seat towards a desired position on the basis of a control signal which represents the desired position.

Preferably, the control signal is a radio wave signal or electric or electronic signal.

These features are found to be particularly advantageous in order to modify the orientation of the user by moving the user from an initial position towards the desired position.

The presence of four rotation axes allows the control unit to move the simulation device by acting on the rotation of the rotary base and/or the first ring and/or second ring and/or the support element about the respective rotation axes so as to move the user received in the seat from an initial position towards the desired position by preventing critical configurations with respect to the simulation device from being taken up.

In the context of the present invention, critical configurations of the simulation device are the cardan blocking configurations in which the simulation device finds it impossible to rotate about an axis incident to the first axis and the second axis, that is to say, having a single point in common with the first axis and the second axis, or configurations near the cardan blocking configurations in which the arrangement of the four rotation axes in space is such as to involve an energy expenditure and/or a mechanical force which is particularly great on the part of the simulation device to modify the position of the user received in the seat as a function of the control signal.

According to an embodiment of the invention, the control unit is provided to rotate the rotary base, first ring, second ring and support element about the respective rotation axes so that the simulation device takes up a configuration which tends towards an optimum configuration, in which a (any) triplet of the rotation axes mentioned above are substantially orthogonal to each other, that is to say, in which any three axes from the first, second, third and fourth rotation axes are substantially orthogonal to each other, during the movement of the user who is received in the seat towards the desired position.

In the context of the present invention, three rotation axes are substantially orthogonal to each other if the angle formed between each pair of such axes is between 70° and 110°, more preferably between 80° and 100°.

This feature is found to be particularly advantageous to prevent critical configurations of the simulation device, in particular it allows movement of the simulation device along an efficient trajectory in terms of energy expenditure and/or mechanical force.

According to an embodiment of the invention, the control unit is configured to rotate at least one of the rotary base, first ring, second ring and support element on the basis of the rotation of at least one of the others of the rotary base, first ring, second ring and support element about the individual rotation axis so as to prevent a blocking condition of the simulation device, in which the third axis and fourth axis extend one in the direction of the first axis and the other in the direction of the second axis (cardan blocking).

In the blocking condition mentioned above, the simulation device finds it impossible to rotate about an axis incident to the first axis and second axis, thereby losing a degree of freedom of rotation.

Therefore, this feature of the invention allows, in particular, the blocking condition of the simulation device to be prevented.

According to an embodiment of the invention, the control unit is configured to rotate the rotary base on the basis of the rotation of at least one of the first ring, second ring and support element about the individual rotation axis so as to prevent the blocking condition.

For reasons of construction of the simulation device, the rotary base is inevitably subjected to an inertia which is greater with respect to the first ring, second ring and support element, particularly because it supports the weight of the movable structure. Therefore, the provision for controlling the rotation of the rotary base following the rotation of at least one of the first ring, second ring and the support element allows the movement of the movable structure to be controlled with sufficient speed so as to position the user received in the seat in the desired position and, at the same time, sudden variations of rotation of the movable base to be prevented.

According to an embodiment of the invention, the simulation device comprises a first sensor, a second sensor, a third sensor and a fourth sensor which are connected to the rotary base, second ring, first ring and support element, respectively, in order to generate respective signals correlated with the angle of rotation of these elements about the respective rotation axes.

The control unit is operatively connected to the sensors so as to move the user received in the seat towards the desired position on the basis of the control signal and the signal generated by at least one of the sensors.

The provision of the sensors allows the control unit to establish the spatial position of the four rotation axes and, consequently, to rotate the rotary base, first ring, second ring and support element in such a manner that the configuration of the simulation device tends towards an optimum configuration in terms of the movement of the user received in the seat towards the desired position.

According to an embodiment of the invention, the simulation device comprises a viewer.

The viewer comprises at least one screen which is arranged in the region of the seat of the simulation device in such a manner that the user received in the seat is capable of viewing the images, in particular moving images, which are displayed by the at least one screen.

The viewer can be fixed to the support element.

Alternatively, the viewer is constructed in the form of goggles or a helmet with a visor so as to be able to be worn by the user of the simulation device. In this case, at least one lens of the goggles or the visor of the helmet is provided with a screen in order to display images, in particular moving images.

The provision of the viewer allows an increase in the immersion of the user in the virtual reality experience during the movement of the simulation device.

According to an embodiment of the invention, the support element comprises a third ring which is internal with respect to the second ring and which is secured, in particular hinged, thereto with the ability to rotate with respect to the second ring about the fourth rotation axis.

In particular, the third ring and the second ring are concentric, with the radius of the third ring being smaller than that of the second ring.

Preferably, the third ring is secured, in the region of two diametrically opposite portions thereof along the fourth rotation axis, to respective diametrically opposite portions of the second ring by means of respective rotoidal pairs.

Preferably, at least one of the rotoidal pairs mentioned above is actuated by the actuator of the support element.

According to an alternative embodiment of the invention, the support element comprises a rod which extends longitudinally between two ends thereof. The rod is secured, in particular hinged, to the second ring by means of the above-mentioned ends thereof with the ability to rotate with respect to the second ring about the fourth rotation axis.

In particular, the rod is secured, in the region of the diametrically opposite longitudinal ends thereof along the fourth rotation axis, to respective diametrically opposite portions of the second ring by means of respective rotoidal pairs.

Preferably, at least one of the rotoidal pairs mentioned above is actuated by the actuator of the support element.

Preferably, the rod is provided in the simulation device when the first ring and the second ring form the above-mentioned rotation thrust bearing.

This feature is found to be particularly appreciable from the point of view of accessibility of the user to the seat because the movable structure obtained in this manner does not have the spatial requirement caused by the second ring and/or the third ring.

According to an embodiment of the invention, the support element comprises at least one seat member which delimits the seat.

According to the embodiment of the invention, the seat member may be fixed to the third ring or to the rod.

Preferably, the rod comprises a central portion, which is offset with respect to the ends thereof and to which the seat member is fixed in such a manner that the centre of gravity of the user sitting on the seat member coincides to the greatest possible extent to the centre of rotation defined by the intersection of the four rotation axes claimed above.

According to an embodiment of the invention, when the simulation device is in an initial configuration, the seat member is in an upright position and the second rotation axis, the third rotation axis and the fourth rotation axis are orthogonal to each other.

In the context of the present invention, the seat member is in an upright position if the respective seat has a substantially horizontal extent. Preferably, the seat member is provided with a backrest which extends from the seat in a substantially vertical direction and away from the platform when the seat member is in the upright position.

In particular, the third rotation axis or the fourth rotation axis extends in the direction of the first rotation axis when the simulation device is in the initial configuration.

According to an embodiment of the invention, the simulation device, in particular the movable structure, is provided with a control device which is arranged in the region of the seat so that a user who is received in the seat can interact with the control device.

The control device is operatively connected to the control unit and is configured to generate the control signal which represents the desired position of the user who is received in the seat in accordance with an interaction of the user with the control device.

These features advantageously allow the user who is received in the seat to control directly or indirectly the movement of the movable structure.

According to an embodiment of the invention, the control device comprises a joystick which can be actuated by a user who is received in the seat of the movable structure and the control signal is correlated with the movement of the joystick manoeuvred by the user.

According to an alternative embodiment of the invention, the control device may be external with respect to the movable structure and/or arranged in a position remote therefrom. Therefore, the user of the control device may not be positioned in the seat, that is to say, the user may be external with respect to the movable structure control device. In this case, the control device may also be provided with a joystick but this will be actuated by the user of the control device rather than by the user who is received in the seat of the simulation device.

According to an aspect of the invention, the method for moving the simulation device comprises a step of rotating the rotary base, the first ring, the second ring and the support element about the respective rotation axes so as to move the user who is received in the seat of the movable structure towards a desired position on the basis of a control signal which represents the desired position.

BRIEF DESCRIPTION OF THE DRAWINGS

Features and additional advantages of the invention will be better appreciated from the following detailed description of preferred though non-exclusive embodiments thereof which are illustrated by way of non-limiting example with reference to the appended drawings, in which.

DESCRIPTION OF EMBODIMENTS OF THE INVENTION

Figure 1:
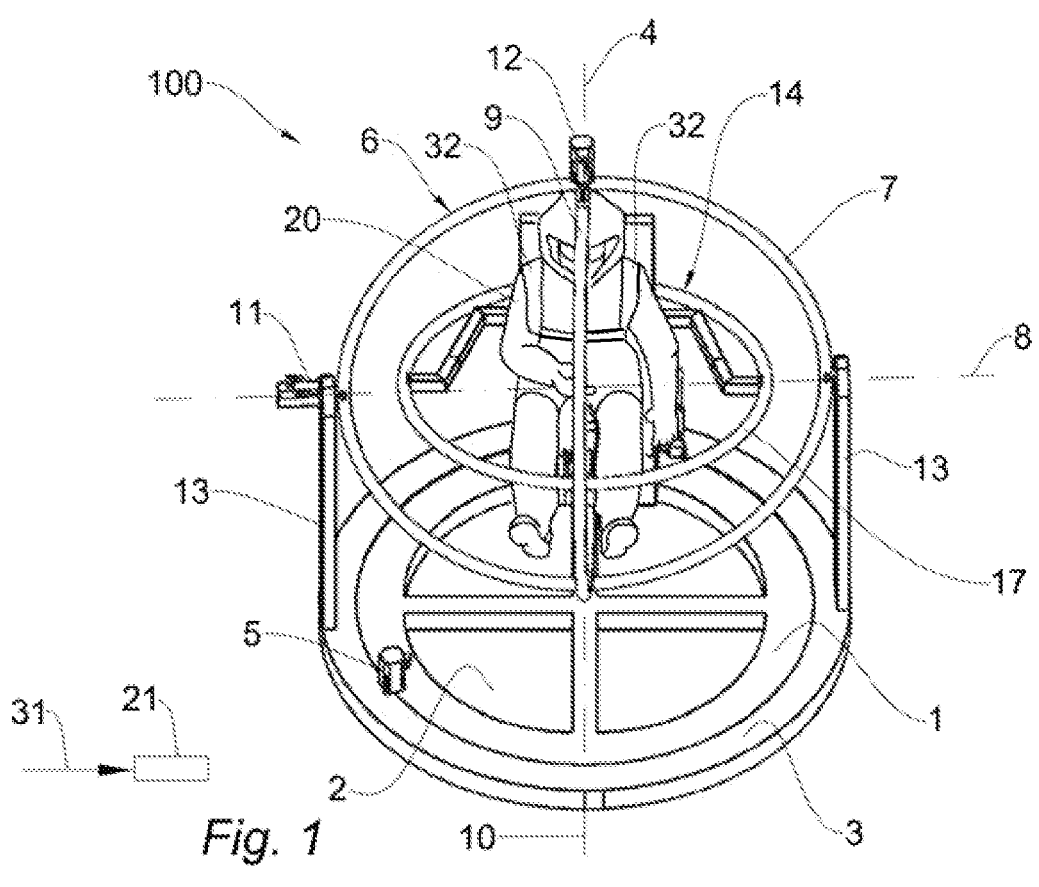
FIG. 1 is a schematic illustration of a simulation device according to a first embodiment of the invention.

With reference initially to FIG. 1, there is generally designated 1000 a simulation device according to a first embodiment of the invention.

Figure 2:
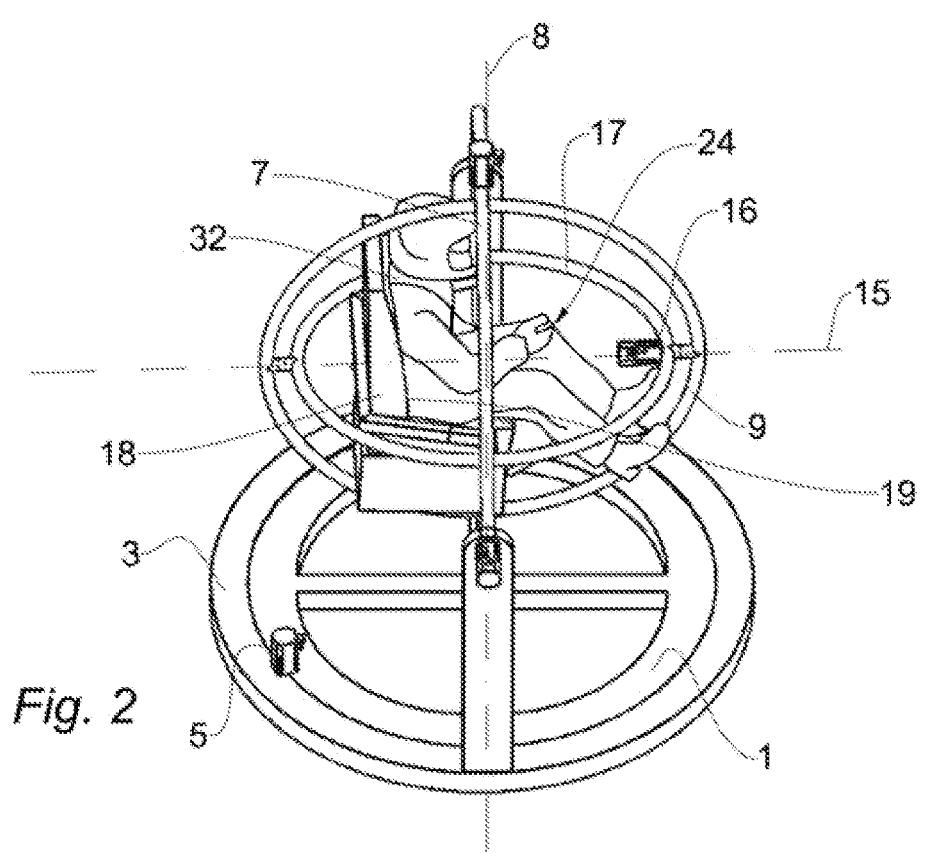
FIG. 2 shows the simulation device of FIG. 1 in a different configuration.

FIGS. 1 and 2 show the simulation device 100 in an initial configuration and in a second configuration, respectively.

The simulation device 100 comprises a platform 1 which is intended to be positioned on a horizontal plane 2 and a rotary base 3 which is secured to the platform 1 with the ability to rotate with respect thereto about a first rotation axis 4. The first rotation axis 4 extends in a vertical direction when the platform 1 is positioned on the horizontal plane 2. The rotary base 3 is actuated by an electromechanical actuator 5.

The simulation device 100 comprises a movable structure 6 which is supported by the rotary base 3.

The movable structure 6 comprises a first ring 7 which is secured to the rotary base 3 with the ability to rotate with respect to the rotary base 3 about a second rotation axis 8 which is perpendicular to the first rotation axis 4 and a second ring 9 which is internal with respect to the first ring 7 and which is secured thereto with the ability to rotate with respect to the first ring 7 about a third rotation axis 10 which is perpendicular to the second rotation axis 8.

The first ring 7 and the second ring 9 are actuated by respective electromechanical actuators 11, 12 and are hinged to a pair of arms 13 of the rotary base 3 which are vertically upright parallel with the first rotation axis 4 and the first ring 7, respectively.

The movable structure 6 comprises a support element 14 which is internal with respect to the second ring 9 and which is secured thereto with the ability to rotate with respect to the second ring 9 about a fourth rotation axis 15 (which is visible in FIG. 2) which is perpendicular to the third rotation axis 10. The support element 14 is preferably actuated by an electromechanical actuator 16.

Figure 3:
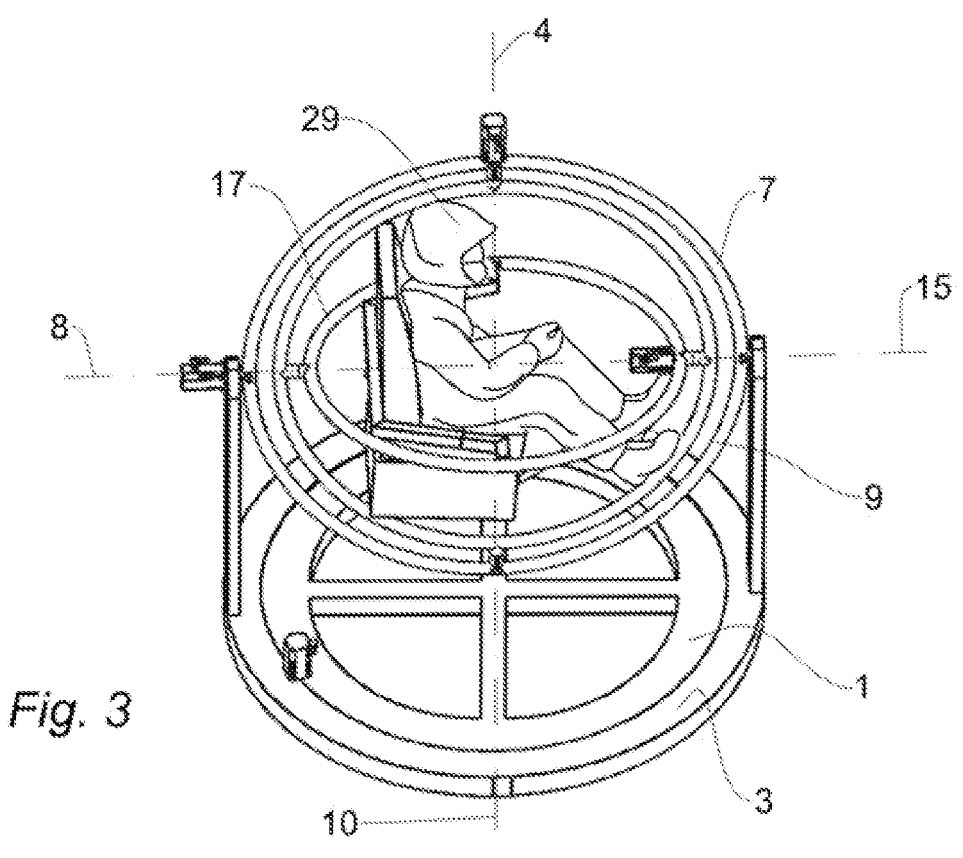
FIG. 3 shows the simulation device of FIG. 1 in a blocking condition.

With reference to FIGS. 1 to 3, the support element 14 comprises a third ring 17 which is internal with respect to the second ring 9 and which is secured thereto with the ability to rotate with respect to the second ring 9 about the fourth rotation axis 15. The third ring 17 is hinged to the second ring 9.

The support element 14 comprises a seat member 18 which is fixed to the third ring 17 and which defines a seat 19 for receiving a user 20 of the simulation device 100.

The movable structure 6 is further provided with a belt 32 for firmly securing the user 20 to the seat member 18.

The seat member 18 is in an upright position in the initial configuration of the simulation device 100 which is shown in FIG. 1.

The simulation device 100 further comprises a control unit 21 which is operatively connected to the rotary base 3, first ring 7, second ring 9 and support element 14 and which is configured to rotate those elements about the respective rotation axes 4, 8, 10, 15 by means of the respective electromechanical actuators so as to move the user 20 who is received in the seat 19 towards a desired position on the basis of a control signal 31 which represents the desired position.

FIG. 2 shows the simulation device 100 in a second configuration in which the user 20 who is received in the seat 19 has reached the desired position which is different from the initial position which is shown in FIG. 1, following a movement of the simulation device 100.

The control unit 21 is provided to rotate the rotary base 3, the first ring 7, the second ring 9 and the support element 14 about the respective rotation axes 4, 8, 10, 15 so that the simulation device takes up a configuration which tends towards an optimum configuration, in which any triplet of the rotation axes 4, 8, 10, 15 are substantially orthogonal to each other, during the movement of the user 20 who is received in the seat 19 towards the desired position.

In specific terms, the control unit 21 is configured to rotate the rotary base 3 on the basis of the rotation of at least one of the first ring 7, the second ring 9 and the support element 14 about the individual rotation axis 8, 10, 15 so as to prevent a blocking condition of the simulation device 100, in which the third rotation axis 10 and fourth rotation axis 15 extend one in the direction of the first rotation axis 4 and the other in the direction of the second rotation axis 15.

In order to move the user 20 from the initial position which is shown in FIG. 1 and in which the simulation device 100 is in an optimum configuration (the rotation axes 8, 10, 15 form a triplet of orthogonal axes) to a desired position, in which the user 20 is rotated to his/her left through 90°, the control unit 21 will therefore provide for controlling the rotation of the movable structure 6 and the rotation through 90° of the rotary base 3 in a counter-clockwise direction, reaching a second optimum configuration of the simulation device 100 which is shown in FIG. 2 (the rotation axes 8, 10, 15 are still orthogonal to each other).

FIG. 3 also shows the user 20 in the desired position, but this configuration would be obtained following a different rotation of the movable structure 6 from the configuration of the simulation device 100 shown in FIG. 1. In this case, however, the simulation device 100 would reach a blocking condition (the first rotation axis 4 and the third rotation axis 10 are coincident and the second rotation axis 8 and the fourth rotation axis 15 are coincident) so that this configuration is prevented by the control unit 21 which will instead choose to arrive at the same position of the user 20 by means of the movement illustrated in FIG. 2.

The simulation device 100 further comprises a first sensor, a second sensor, a third sensor and a fourth sensor (not shown in the Figures) which are connected to the rotary base 3, the second ring 9, the first ring 7 and the support element 14, respectively, in order to generate respective signals which are correlated with the angle of rotation of these elements about the respective rotation axes 4, 8, 10, 15. The control unit 21 is operatively connected to the sensors so as to move the user 20 who is received in the seat 19 towards the desired position on the basis of the control signal 31 and the signal generated by at least one of the sensors.

The movable structure 6 is further provided with a control device 24 which is arranged in the region of the seat 19 so that the user 20 who is received in the seat 19 can interact therewith.

The control device 24 is operatively connected to the control unit 21 and is configured to generate the control signal 31 in accordance with an instruction-related interaction of the user 20.

In specific terms, the control device 24 is a joystick which is capable of generating the control signal.

FIGS. 1 to 3 further show a viewer 29 which is worn by the user 20. The viewer 29 is a helmet with a visor which is provided with a screen in order to display images, in particular moving images, which allow an increase in the immersion of the user 20 in the virtual reality experience during the movement of the simulation device 100.

FIGS. 4 to 7 show a second embodiment of the invention of the simulation device, which is generally designated 101.

The elements of the second embodiment of the simulation device which correspond to those described in relation to the simulation device designated 100 will be indicated with the same numeral, unless otherwise specified.

The simulation device 101 differs from the one illustrated in FIG. 1 in that the support element 14 comprises a rod 25 which extends longitudinally between two ends 26, 27 thereof in place of the third ring 17 and in that the first ring 7 and the second ring 9 are connected to each other so as to form a rotation thrust bearing which is provided with an external ring and an internal ring, wherein the first ring 7 and the second ring 9 define the external ring and the internal ring of the rotation thrust bearing, respectively.

The rod 25 is secured to the second ring 9 by means of the ends 26, 27 with the ability to rotate with respect to the second ring 9 about the fourth rotation axis 15.

The rod 25 comprises a central portion 28 which is offset with respect to the two ends 26, 27 thereof and to which the seat member 18 is fixed.

This embodiment of the invention is found to be particularly advantageous from the point of view of the ease of access to the seat member 18 because it does not have the spatial requirement caused by the second ring 9 and/or the third ring 17.

Similarly to the simulation device 100, the simulation device 101 which is shown in FIGS. 4 to 7 comprises the viewer 29.

Figure 4:
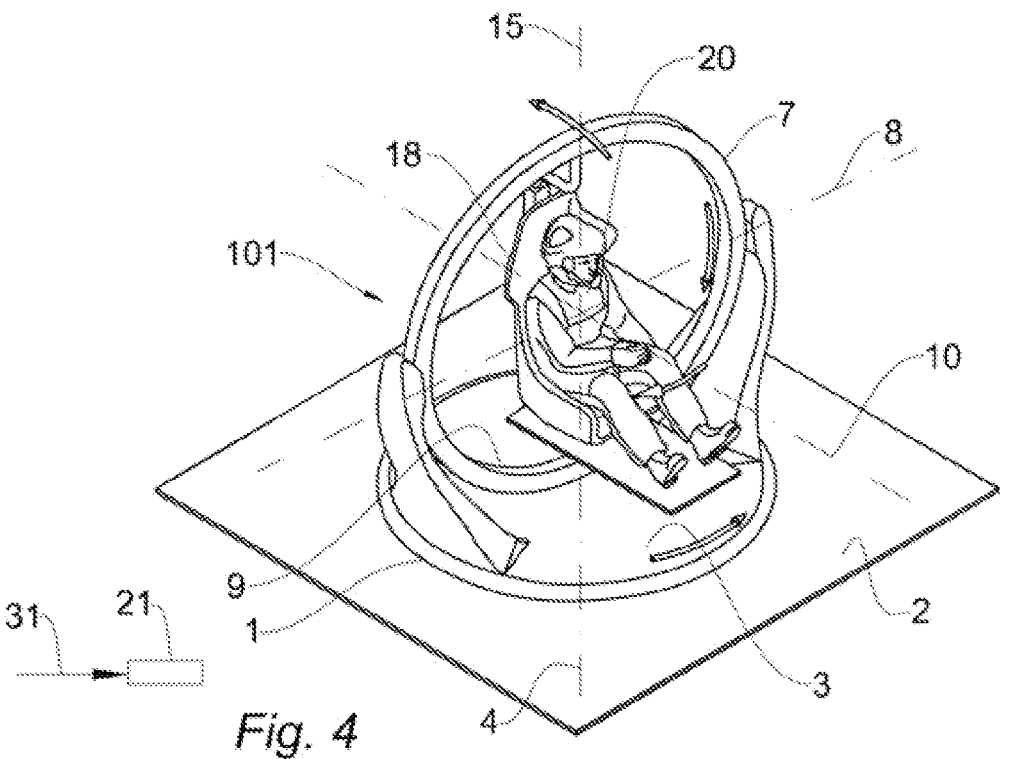
FIG. 4 is a schematic illustration of a simulation device according to a second embodiment of the invention.
Figure 5:
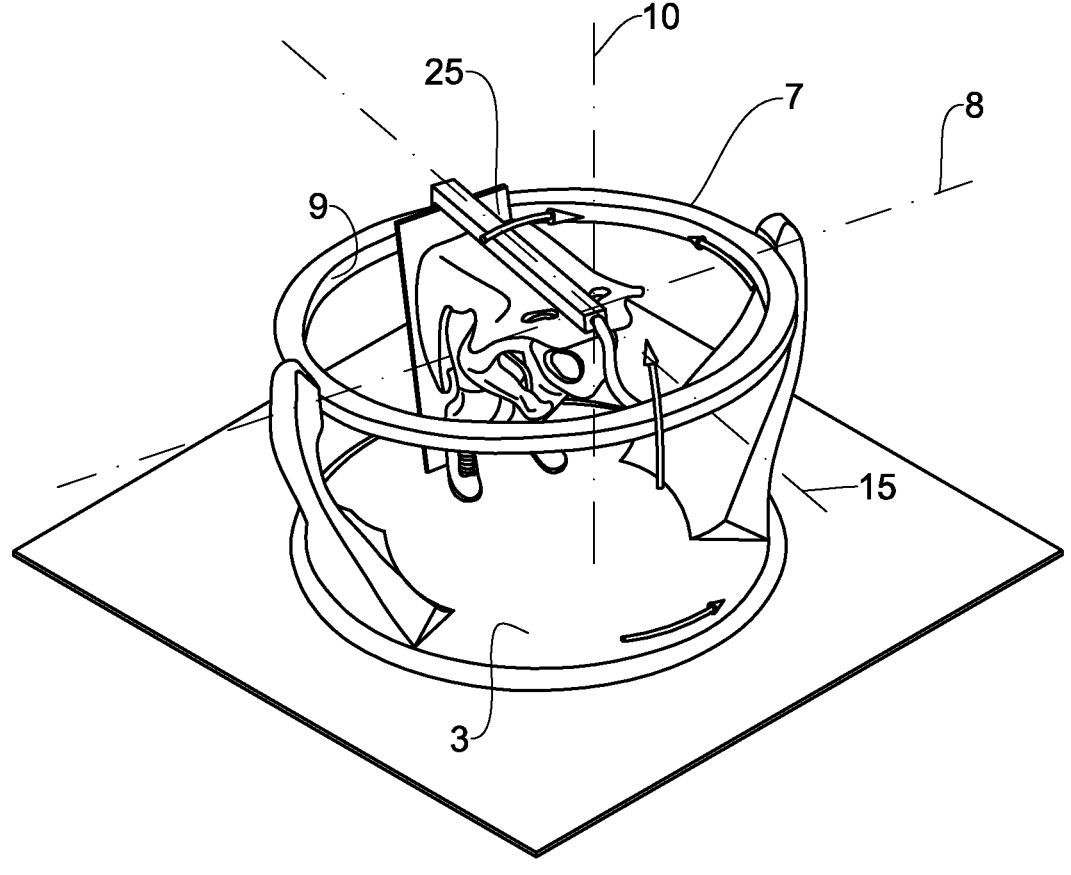
FIG. 5 shows the simulation device of FIG. 4 in a different configuration.
Figure 6:
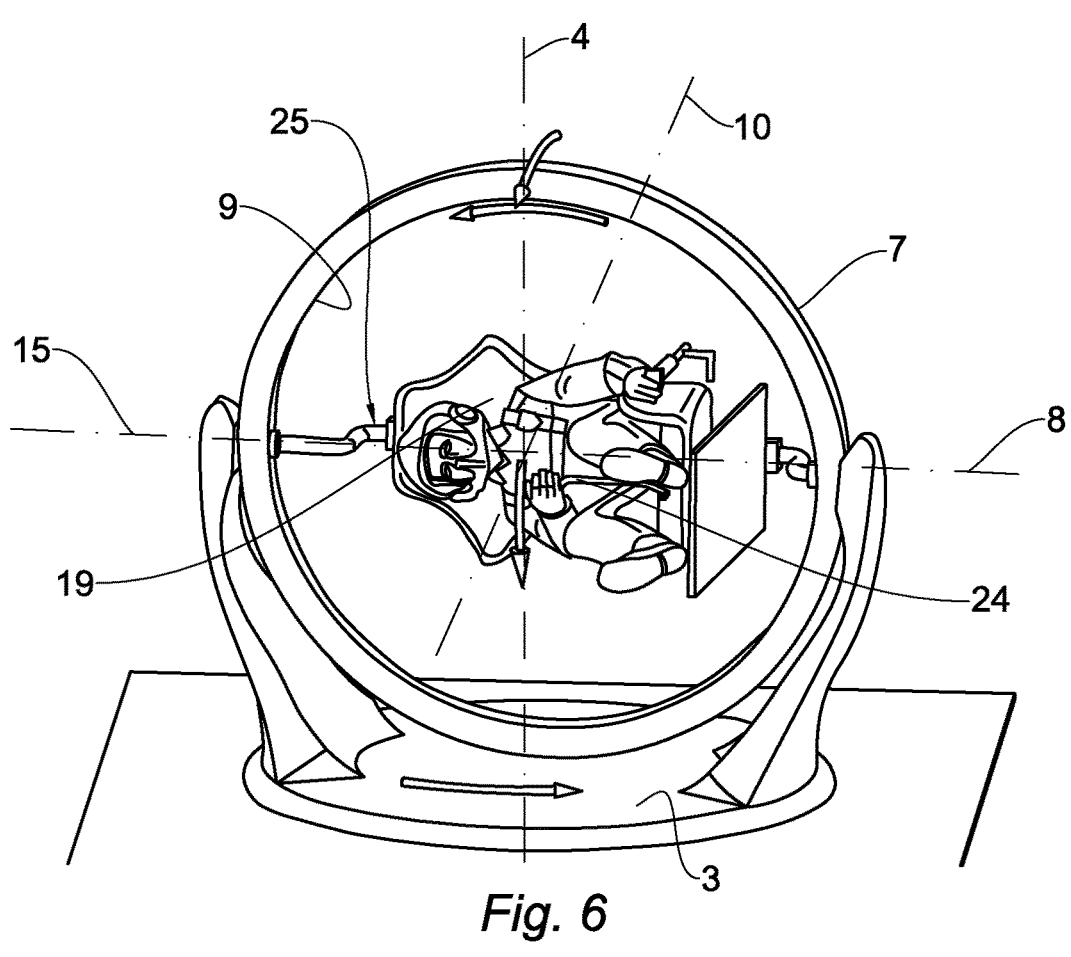
FIG. 6 shows the simulation device of FIG. 4 in an additional configuration.

In specific terms, FIGS. 4, 5 and 6 show the simulation device 101 in three different configurations during the movement of the user 20 from an initial position (FIG. 4) to a desired position (FIG. 6), moving through an intermediate position (FIG. 5).

When the user 20 is in the initial position, the simulation device 101 is in an optimum configuration (the rotation axes 8, 10, 15 form a triplet of orthogonal axes) and as a result of the control unit 21 it is possible to move the user 20 towards the intermediate position and, subsequently, towards the desired position so that the configuration of the simulation device 101 tends to maintain the optimum starting configuration. The simulation device 101 is in fact in an optimum configuration when the user 20 reaches the desired position (the rotation axes 4, 8, 10 form a triplet of orthogonal axes).

Figure 7:
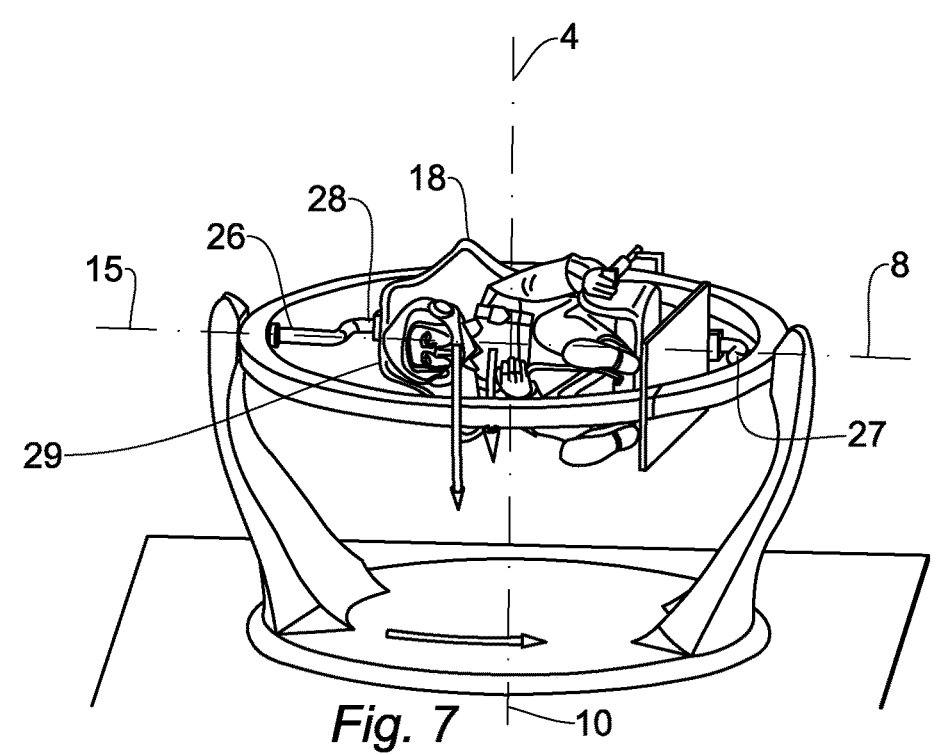
FIG. 7 shows the simulation device of FIG. 4 in a blocking condition.

FIG. 7 also shows the user 20 in the desired position, but this one is obtained following a different movement of the simulation device 101 from the configuration shown in FIG. 6.

The different movement of the simulation device 101, specifically the rotation of the second ring 9 through 90° about the third rotation axis 10 in the clockwise direction and the rotation of the rod 25 about the individual axis through 90° in a counter-clockwise direction, brings about in this case a blocking condition of the simulation device 101 (the first rotation axis 4 and the third rotation axis 10 are coincident and the second rotation axis 8 and the fourth rotation axis 15 are coincident). This condition is prevented by the provision of the control unit 21 according to the invention which will choose to arrive at the same position of the user 20 by means of the movement illustrated in FIG. 6.

The invention thereby achieves the object proposed, at the same time affording the advantages mentioned above.

The invention claimed is:

1. A simulation device comprising:

a platform which is intended to be positioned in a horizontal plane, said platform supporting a seat member, said seat member defining a seat for a user and defining an upright position, wherein said user defines a frontal axis, a sagittal axis and a vertical axis;

a rotary base which is secured to the platform with the ability to rotate with respect to the platform about a first rotation axis which extends in a vertical direction when the platform is positioned in the horizontal plane, a movable structure which is supported by the rotary base, the movable structure comprising:

a first ring which is secured to the rotary base with the ability to rotate with respect to the rotary base about a second rotation axis which is perpendicular to the first rotation axis and which is, when said seat member is in said upright position and said user is properly seated, parallel to said frontal axis, a second ring which is internal with respect to the first ring and which is secured thereto with the ability to rotate with respect to the first ring about a third rotation axis which is perpendicular to the second rotation axis and which is, when said seat member is in said upright position and said user is properly seated, parallel to said sagittal axis, and a support element which is internal with respect to the second ring and which is secured thereto with the ability to rotate with respect to the second ring about a fourth rotation axis which is perpendicular to the third rotation axis, the support element comprising the seat for receiving a user of the simulation device, a control unit which is operatively connected to the rotary base, first ring, second ring and support element and which is configured to rotate those elements about the respective rotation axes so as to move the user who is received in the seat towards a desired position on the basis of a control signal which represents the desired position.

2. The simulation device according to claim 1, wherein the control unit is provided to rotate the rotary base, first ring, second ring and support element about the respective rotation axes so that the simulation device takes up a configuration which tends towards an optimum configuration, in which a triplet of the rotation axes are substantially orthogonal to each other, during the movement of the user who is received in the seat towards the desired position.

3. The simulation device according to claim 1, wherein the control unit is configured to rotate at least one of the rotary base, first ring, second ring and support element on the basis of the rotation of at least one of the other of the rotary base, first ring, second ring and support element about the individual rotation axis to prevent a blocking condition of the simulation device, in which the third rotation axis and fourth rotation axis extend one in the direction of the first rotation axis and the other in the direction of the second rotation axis.

4. The simulation device according to claim 3, wherein the control unit is configured to rotate the rotary base on the basis of the rotation of at least one of the first ring, second ring and support element about the individual rotation axis so as to prevent the blocking condition of the simulation device.

5. The simulation device according to claim 1, wherein the simulation device further comprises a first sensor, a second sensor, a third sensor and a fourth sensor which are connected to the rotary base, second ring, first ring and support element, respectively, in order to generate respective signals correlated with the angle of rotation of these elements about the respective rotation axes, wherein the control unit is operatively connected to the sensors so as to move the seat towards the desired position on the basis of the control signal and the signal generated by at least one of the sensors.

6. The simulation device according to claim 1, wherein the support element comprises a third ring which is internal with respect to the second ring and which is secured thereto with the ability to rotate with respect to the second ring about the fourth rotation axis.

7. The simulation device according to claim 1, wherein the first ring and second ring are connected to each other so as to form a rotation thrust bearing which is provided with an external ring and an internal ring which can slide on the external ring, wherein the first ring and second ring define the external ring and the internal ring of the rotation thrust bearing, respectively.

8. The simulation device according to claim 7, wherein the support element comprises a rod which extends longitudinally between two ends thereof, the rod being secured to the second ring by means of the ends thereof with the ability to rotate with respect to the second ring about the fourth rotation axis.

9. The simulation device according to claim 1, wherein the simulation device is provided with a control device which is arranged in the region of the seat so that a user who is received in the seat can interact with the control device, the control device being operatively connected to the control unit and being configured to generate the control signal in accordance with an interaction of the user with the control device.

10. The simulation device according to claim 9, wherein the control device comprises a joystick which can be actuated by a user who is received in the seat of the movable structure and the control signal is correlated with the movement of the joystick maneuvered by the user.

11. A method for moving a simulation device according to claim 1, comprising a step of rotating the rotary base, the first ring, the second ring and the support element about the respective rotation axes to move the user who is received in the seat of the movable structure towards a desired position on the basis of a control signal which represents the desired position.

\* \* \* \* \*